United States Patent [19]

Jahns et al.

[11] Patent Number: 5,292,835
[45] Date of Patent: Mar. 8, 1994

[54] MICROCAPSULES

[75] Inventors: Ekkehard Jahns, Hirschberg; Ulrich Freundschuh, Heidelberg, both of Fed. Rep. of Germany

[73] Assignee: BASF Aktiengesellschaft, Ludwigshafen, Fed. Rep. of Germany

[21] Appl. No.: 93,996

[22] Filed: Jul. 21, 1993

Related U.S. Application Data

[63] Continuation of Ser. No. 896,870, Jun. 12, 1992, abandoned, which is a continuation-in-part of Ser. No. 699,526, May 14, 1991, abandoned.

[30] Foreign Application Priority Data

May 16, 1990 [DE] Fed. Rep. of Germany ....... 4015753

[51] Int. Cl.$^5$ ...................... B01J 13/02; C08F 218/02
[52] U.S. Cl. .................................. 526/73; 428/402.2; 428/402.21; 428/402.22; 526/319; 526/323.1; 526/323.2
[58] Field of Search .................... 428/402.22; 526/73, 526/319, 323.2

[56] References Cited

U.S. PATENT DOCUMENTS

| | | | |
|---|---|---|---|
| 4,025,502 | 5/1977 | MacLeay | 260/192 |
| 4,069,377 | 1/1978 | MacLeay | 526/218 |
| 4,125,636 | 11/1978 | Karnio | 427/150 |
| 4,770,904 | 9/1988 | Zink | 427/150 |
| 4,798,691 | 1/1989 | Kasai | 264/47 |
| 4,908,271 | 3/1990 | Kasai | 428/402.22 |

FOREIGN PATENT DOCUMENTS 198089 10/1986 European Pat. Off. ....... B01J 13/02

OTHER PUBLICATIONS

G. Odian, "Principles of Polymerization," 3rd Ed. (275-278) 1991, Wiley (New York).

Primary Examiner—Joseph L. Schofer
Assistant Examiner—Fred Zitomer
Attorney, Agent, or Firm—Keil & Weinkauf

[57] ABSTRACT

Microcapsules useful for producing pressure-sensitive recording materials are obtainable by polymerizing A) 30–100% by weight of one or more $C_1$–$C_{24}$-alkyl esters of acrylic or methacrylic acid (monomers I), B) 0–80% by weight of a bi- or polyfunctional monomer (monomer II) which is soluble in a solvent which is insoluble or only sparingly soluble in water, and C) 0–40% by weight of other monomers (monomers III), the solvent being present alone or together with the monomers and a free radical initiator as the disperse phase of a stable oil-in-water emulsion and the polymerization being initiated and controlled by the thermal decomposition of the free radical initiator.

8 Claims, No Drawings

MICROCAPSULES

This application is a continuation of application Ser. No. 07/896,870, filed on Jun. 12, 1992, which is a continuation-in-part of application Ser. No. 07/699,526, filed on May 14, 1991.

The present invention relates to microcapsules which are obtainable by polymerizing A) 30–100% by weight of one or more $C_1$–$C_{24}$-alkyl esters of acrylic or methacrylic acid (monomers I), B) 0–80% by weight of a bi- or polyfunctional monomer (monomer II) which is soluble in a solvent which is insoluble or only sparingly soluble in water, and C) 0–40% by weight of other monomers (monomers III), the solvent being present alone or together with the monomers and a free radical initiator as the disperse phase of a stable oil-in-water emulsion and the polymerization being initiated and controlled by the thermal decomposition of the free radical initiator.

The present invention also relates to a process for preparing microcapsules, to the use of color former microcapsules for producing pressure-sensitive recording materials and to these recording materials.

EP-A-026 914, EP-A-133 295 and EP-A-218 887 disclose microcapsules which are based on melamine-formaldehyde resins and are recommended for pressure-sensitive recording materials.

A further method for preparing microcapsules is that of in situ polymerization. The microcapsules are produced, for example by the method described in EP-A-198 089, by first preparing a solution of monomers such as acrylic esters, a water-insoluble solvent, a free radical initiator, a polymer and the substance to be encapsulated and then converting this solution into a stable oil-in-water emulsion. Then the polymerization of the monomers is initiated by raising the temperature, and the resulting polymers form the walls of capsules which tightly enclose the remaining organic solution of the substance which is to be encapsulated.

The substances mentioned for microencapsulation in this context are dyes, detergents, printing inks, perfumes, adhesives, medicines, agrochemicals, fertilizers, fats, oils, nutrients, enzymes, liquid crystals, paints, rustproofing agents, recording materials, catalysts, chemical reactants and magnetic substances.

The microcapsules of the present invention are prepared from 30 to 100% by weight, preferably 30–95% by weight, of one or More $C_1$–$C_{24}$-alkyl esters of acrylic and/or methacrylic acid as monomers I.

In addition, the microcapsules of the present invention may also be formed from up to 80% by weight, preferably 5–40% by weight, of a bi- or polyfunctional monomer which is soluble in a water-insoluble or only sparingly water-soluble solvent as monomer II and from up to 40% by weight, preferably up to 30% by weight, of other monomers III.

Suitable monomers I are $C_1$–$C_2$-alkyl esters of acrylic and/or methacrylic acid. Particularly preferred monomers I are methyl, ethyl, n-propyl, n-butyl and 2-ethylhexyl acrylates and methacrylates. Preference is given to isopropyl, isobutyl, sec-butyl and tert-butyl acrylates and methacrylates. But it is also possible to use n-pentyl, n-hexyl, n-heptyl, n-octyl and lauryl acrylates and methacrylates.

Suitable additional monomers II are bi- or polyfunctional monomers which are soluble in water-insoluble or only sparingly water-soluble solvents, chiefly divinyl and polyvinyl monomers which bring about a crosslinking of the capsule walls during the polymerization.

Preferred divinyl monomers are ethanediol diacrylate, divinylbenzene, ethylene glycol dimethacrylate, 1,3-butylene glycol dimethacrylate, methallylmethacrylamide and allyl methacrylate. Particular preference is given to propanediol, butanediol, pentanediol and hexanediol diacrylates or methacrylates.

Preferred polyvinyl monomers are trimethylolpropane triacrylate and methacrylate, pentaerythritol triallyl ether and pentaerythritol tetraacrylate.

The crosslinking may also be effected via groups capable of addition or condensation, with or without further at least bifunctional such groups, in which case the crosslinking reaction is carried out after the polymerization.

Monomers having such groups are, for example glycidyl acrylate and methacrylate and in particular vinyl compounds which contain amino, acetoacetone, epoxy or methylol groups.

The functional groups of these monomers may be crosslinked for example via bi- or polyfunctional epoxies, amines and alcohols, preferably via urea- and melamine-formaldehyde precondensates.

Particularly good results with subsequent crosslinking are obtained on using acetoacetoxy ethyl methacrylate as functional monomer and formaldehyde or glutaraldehyde as crosslinking component.

Suitable monomers III are any other monomers, preferably styrene, α-methylstyrene, β-methylstyrene, butadiene, isoprene, vinyl acetate, vinyl propionate and vinylpyridine.

Particularly preferred monomers III are acrylonitrile, methacrylamide, acrylic acid, methacrylic acid, itaconic acid, maleic acid, maleic anhydride, N-vinylpyrrolidone, 2-hydroxyethyl methacrylate and acrylamido-2-methylpropanesulfonic acid.

It is also possible to use N-methylolacrylamide, N-methylolmethacrylamide, dimethylaminoethyl methacrylate and diethylaminoethyl methacrylate.

The microcapsules of the present invention are prepared by polymerization of monomers It II and III, said polymerization being initiated and controlled by raising the temperature to a level where the thermal decomposition of the free radical initiator takes place.

Suitable free radical initiators for the polymerization reaction are the customary peroxo and azo compounds, advantageously in amounts of from 0.2 to 5% by weight, based on the weight of the monomers.

Preferred free radical initiators are tert-butyl peroxyneodecanoate, tert-amyl peroxypivalate, dilauryl peroxide, tert-amyl peroxy-2-ethylhexanoate, 2,2'-azobis-(2,4-dimethyl)valeronitrile, 2,2'-azobis(2-methylbutyronitrile), dibenzoyl peroxide, tert-butyl per-2-ethylhexanoate, di-tert-butyl peroxide, tert-butyl hydroperoxide, 2,5-dimethyl-2,5-di(tert-butylperoxy)hexane and cumene hydroperoxide.

Particularly preferred free radical initiators are di(3,5,5 imethylhexanoyl) peroxide, 4,4'-trazobisisobutyronitrile, tert-butyl perpivalate and dimethyl 2,2-azobisisobutyrate. These have a half-life of 10 hours within the temperature range from 30° to 100° C.

The monomers and the free radical initiator can be dissolved in a water-insoluble or only sparingly water-soluble solvent which forms the disperse phase of a stable oil-in-water emulsion. It is however also possible first to disperse the solvent and add the monomers and the free radical initiator to the dispersion. A further possibility is to place the solvent and monomers in dispersion and to add just the free radical initiator subsequently. The solvent may of course contain other substances, such as color formers.

Suitable water-insoluble or only sparingly water-soluble solvents are natural oils, synthetic oils and solvents having boiling points within the range from 80° to 350° C., preferably from 150° to 350° C. The oil content of the oil-in-water emulsion is preferably 20–60% by weight.

Preferred water-insoluble or only sparingly water-soluble solvents are gasolines, mineral oils, paraffins, chloroparaffins, fluorocarbons, groundnut oil, soybean oil, chlorinated biphenyls, tributyl phosphate, dibutyl maleate, o-dichlorobenzene, benzyl alcohol, diisopropylenenaphthalene and 1-phenyl-1-xylylethane.

Particularly high solubilities of the substances such as color formers contained in the water-insoluble or only sparingly water-soluble solvents are obtained in those solvents whose boiling points are within the range from 150° to 350° C., for example in dibutyl phthalate, diisoheptyl phthalate, dioctyl phthalate, alkylnaphthalenes and partially hydrogenated terphenyls and in particular in diisopropylnaphthalene, dodecylbenzene and mixtures thereof.

The substances contained in the capsules are in particular those mentioned on page 2, with color formers being preferred.

Suitable color formers for encapsulation are for example colorless or only slightly colored compounds which are converted into dyes in the presence of acids, as is true for example of numerous phthalides, which as the lactone ring opens form colored open-chain acids.

Preferred color formers are 3,3-bis(p-dimethylaminophenyl)phthalide; 3-(p-dimethylaminophenyl)-3-(1,2-dimethylindol-3-yl)phthalide, 3-(p-dimethylaminophenyl)-3-(2-phenylindol-3-yl)phthalide, Rhodamine-B-anilinolactam, 3-dimethylamino-7-methoxyfluoran, p-nitrobenzoylleuco methylene blue, 3-methylspirodinaphthopyran and 3-propylspirodibenzopyran.

Particular preference is given to 3,3-bis(p-dimethylaminophenyl)-6-dimethylaminophthalide and N-benzoyl-leuco methylene blue and mixtures thereof.

In general, the color formers are used in amounts of from 1 to 10% by weight, preferably from 2 to 8% by weight, based on the oil phase of the emulsion.

Suitable acidic color developers are acid clay, attapulgite, aluminum silicate, benzoic acid, chlorobenzoic acid, toluylic acid, salicylic acid and 4-tert-butylsalicylic acid and also in particular kaolin and alkyl-substituted phenols.

The microcapsules according to the invention can be prepared in a conventional manner, for example by the methods described in EP-A-198 089 with the exception of temperatures during polymerization which are described below and are illustrated in the Examples.

As a general procedure a mixture of water, protective colloids, ionic emulsifiers, water-insoluble or only sparingly water-soluble, i.e. substantially water-insoluble solvents, other substances contained therein in dissolved form, free radical initiators and monomers, added simultaneously or successively, is dispersed with a high-shear mixer to yield a stable oil-in-water emulsion having the desired oildrop size. The emulsion is then advantageously transferred to a different container having a propeller or anchor-type stirring blade to prevent the high-shear mixer from damaging the capsule shells built up during polymerization. The mixture is then heated with stirring to start polymerization by decomposing of the free radical initiators.

To obtain suitable microcapsules for carbonless copy paper the polymerization conditions must be different from those of EP-A-198 089. In Example 1 of EP-A-198 089 a polymerization temperature of 700° C. is chosen for 15 hours. The free radical initiator used is 5,5,5-trimethylhexanoyl peroxide. This initiator has a half-life of 2.3 hours at 70° C. (taken from "Interox" product information, Peroxid-Chemie, D-8023 Höllriegelskreuth). That means that half of the initiator has decomposed after 2.3 hours at 70° C. to radicals that may start a polymerization if monomers are present.

The rate of thermal decomposition of the free radical initiators used in the present process is exponentially dependent on the temperature. For example, 3,5,5-trimethylhexanoyl peroxide has a half-life of 31 hours at 50° C., 8.8 hours at 600° C., 2.3 hours at 70° C. and 0.8 hours at 80° C. A person skilled in the art is able to calculate the half-life times over a wide temperature range from the data published by the producers of initiators or from scientific literature.

For use in carbonless copy paper microcapsules are needed having walls which are as impermeable as possible for the core material. Otherwise the capsules dry out very quickly and no copy of a written text is obtained. It was found by the present inventors that to obtain microcapsules that are useful in carbonless copy paper it is necessary to use initiators at different half-life times and thus at different temperatures. Good capsules are obtained in accordance with the invention if the total polymerization time is divided into at least two periods. The first polymerization period is characterized by a slow decomposition of the free radical initiators. In the second and possibly further polymerization periods the temperature of the reaction mixture is increased to accelerate the decomposition of the free radical initiators. The temperature may be increased in one or more steps or continuously, and linearly or nonlinearly. It is not yet fully understood why such increases in polymerization temperatures give much better microcapsules for carbonless copy paper than the normal method of polymerizing at only one temperature, only. It is speculated, however, that this may be due to the complex process of crosslinking and phase separation which takes place within the capsules during polymerization.

In the first polymerization period the half-life of the initiators is set at long times, preferably between about 3 and 30 hours, to obtain a slow rate of polymerization. In the second and possibly further polymerization periods the decomposition of the initiators is increased by raising the temperature and therefore decreasing their half-life times by at least about a factor of two. Suitable total polymerization times are in the range of from about 0.5 to about 10 hours.

It is obvious to a person skilled in the art that the half-life of the initiators at a certain temperature is not the only reason for a definite rate of polymerization or polymerization speed. The amount of initiators with reference to the total monomer content of the polymerization mixture is also of importance. Therefore the time ranges in the last paragraph refer to an amount of initiators of 1 to 3% by weight of the total monomer weight. Using more initiator may require a longer half-life, just as less initiator may require a shorter half-life to adjust the polymerization conditions to their optimal values.

Advantageously, the polymerization is carried out under atmospheric pressure, but it may also be carried out under a reduced or slightly superatmospheric pressure, say within the range of from about 0.5 to about 5 bar.

Preferred emulsifiers are water-soluble polymers, since they reduce the surface tension of the water from the maximum of 73 mN/m to 45–70 mN/m and thus ensure the formation of continuous capsule walls, giving microcapsules having particle sizes of from 1 to 30 μm, preferably from 3 to 12 μm.

Particularly preferred protective colloids are cellulose derivatives, such as hydroxyethylcellulose, carboxymethylcellulose and methylcellulose, polyvinylpyrrolidone and copolymers of vinylpyrrolidone.

Preference is given to gelatine, gum arabic, xanthan, sodium alginate, casein, polyvinyl alcohol and partially hydrolyzed polyvinyl acetates.

In general, the protective colloids are used in amounts of from 0.1 to 10% by weight, preferably from 0.5 to 5% by weight, based on the water phase of the emulsion.

To improve the stability of the emulsions, ionic emulsifiers may be added. It is particularly important to use ionic emulsifiers if the microcapsule content of the dispersion is large, since without an additional ionic stabilizer the microcapsules may agglomerate. These agglomerates, if from 1 to 3 μm in diameter, would reduce the yield of usable microcapsules or if greater than about 10 μm would increase the rub sensitivity.

Suitable ionic emulsifiers are in particular polymethacrylic acid, the polymers of sulfoethyl acrylate and methacrylate, of sulfopropyl acrylate and methacrylate, of N-(sulfoethyl)maleimide, of 2-acrylamido-2-alkanesulfonic acids, of styrenesulfonic acid or of vinylsulfonic acid.

Preferred ionic emulsifiers are naphthalenesulfonic acid and naphthalenesulfonic acid/formaldehyde condensates and in particular polyacrylic acids and phenolsulfonic acid/formaldehyde condensates.

The ionic emulsifiers are in general used in amounts of from 0.1 to 10% by weight, based on the water phase of the emulsion.

Preferably, the polymerization conditions are selected in a conventional manner which serves to ensure that the microcapsules have diameters of from 1 to 35 μm, in particular from 3 to 15 μm.

The viscosities of the capsule dispersions are measured in seconds as efflux times of 100 ml of the dispersion from the 4 mm Ford cup in accordance with German Standard Specification DIN 53 211.

The dispersions of the microcapsules of the present invention have solids contents of preferably 20–60% by weight.

The color former microcapsules of the present invention are used for producing pressure-sensitive recording materials.

These materials are primarily copy papers which are impregnated with the color developer and coated with a dispersion of microcapsules. The pressure of the writing implement causes the microcapsules to burst open, so that the color formers, or dye-forming components, form a dye on development.

The microcapsule dispersions obtainable according to the present invention can be used directly for paper coating or they can be dried, for example spray dried, and redispersed before use.

EXAMPLES

Preparation of Color Former Microcapsules

Example 1

A mixture of
1280 g of water
20 g of polyvinylpyrrolidone of K 90
15 g of phenolsulfonic acid/formaldehyde condensate
522 g of diisopropylnaphthalene
522 g of dodecylbenzene
48 g of a mixture of 36 g of 3,3-bis(p-dimethylaminophenyl)-6-dimethylaminophthalide and 12 g of N-benzoylleuco methylene blue
168 g of methyl methacrylate
19 g of butanediol diacrylate 1.4 g of azobisisobutyronitrile
2 g of dimethyl 2,2-azobisisobutyrate
was dispersed at room temperature for 20 minutes. It was then heated, with continuing dispersing, to 60° C. and maintained at that temperature for 1½ hours. This is followed by heating at 65° C., further polymerization for 4 hours and cooling.

The solids content of the dispersion obtained was 49.1% by weight, and efflux time from the Ford cup was 101 seconds.

The average particle size of the microcapsules is 5.6 μm with a practical variation in size from 3 to 7 μm.

Example 2

This dispersion was prepared in the manner of Example 1 from the following components:
1287 g of water
20 g of polyvinylpyrrolidone of K 90
18 g of phenolsulfonic acid/formaldehyde condensate
732 g of diisopropylnaphthalene
314 g of a high-boiling aliphatic hydrocarbon mixture (boiling range 230°–265° C.)
48 g of a mixture of 36 g of 3,3-bis(p-dimethylaminophenyl)-6-dimethylaminophthalide and 12 g of N-benzoylleuco methylene blue
131 g of methyl methacrylate 56 g of butanediol diacrylate
1.4 g of azobisisobutyronitrile
2 g of dimethyl 2,2-azobisisobutyrate.

The solids content of the dispersion obtained was 48.5% by weight, and efflux time from the Ford cup was 135 seconds.

The average particle size of the microcapsules is 5.4 μm with a practical variation in size from 3 to 7 μm.

Example 3

This dispersion was prepared in the manner of Example 1 from the following components:
1280 g of water
20 g of polyvinylpyrrolidone of K 90
15 g of phenolsulfonic acid/formaldehyde condensate
732 g of diisopropylnaphthalene
314 g of a high-boiling aliphatic hydrocarbon mixture (boiling range 230°–265° C.)

93.5 g of a mixture of 36 g of 3,3-bis(p-dimethylaminophenyl)-6-dimethylaminophthalide and 12 g of N-benzoylleuco methylene blue
93.5 g of methyl methacrylate
37.4 g of butanediol diacrylate
1.4 g of azobisisobutyronitrile
2 g of dimethyl 2,2-azobisisobutyrate.

The solids content of the dispersion obtained was 48.6% by weight, and efflux time from the Ford cup was 103 seconds.

The average particle size of the microcapsules is 5.8 μm with a practical variation in size from 3 to 8 μm.

Example 4

This dispersion was prepared in the manner of Example 1 from the following components:
1270 g of water
15 g of polyvinylpyrrolidone of K 90
15 g of phenolsulfonic acid/formaldehyde condensate
636 g of diisopropylnaphthalene
273 g of a high-boiling aliphatic hydrocarbon mixture (boiling range 230°-265° C.)
48 g of a mixture of 36 g of 3,3-bis(p-dimethylaminophenyl)-6-dimethylaminophthalide and 12 g of N-benzoylleuco methylene blue
287 g of methyl methacrylate
33 g of acetoacetoxyethyl methacrylate
5.5 g of azobisisobutyronitrile
2 g of dimethyl 2,2-azobisisobutyrate.

However, after 1¼ hours, polymerization at 60° C. a solution of 4.7 g of formaldehyde and 28 g of water was added over 1 hour, and the temperature was raised to 65° C. and left at that level for 1¼ hours.

The solids content of the dispersion obtained was 48.2% by weight, and efflux time from the Ford cup was seconds.

The average particle size of the microcapsules is 5.5 μm with a practical variation in size from 3 to 8 μm.

EXAMPLE 5

This dispersion was prepared in the manner of Example 1 from the following components:
1280 g of water
20 g of polyvinylpyrrolidone of K 90
15 g of phenolsulfonic acid/formaldehyde condensate
522 g of diisopropylnaphthalene
522 g of dodecylbenzene
48 g of a mixture of 36 g of 3,3-bis(p-dimethylaminophenyl)-6-dimethylaminophthalide and 12 g of N-benzoylleuco methylene blue
19 g of ethyl acrylate
9 g of ethyl methacrylate
19 g of 2-ethylhexylacrylate
112 g of methyl methacrylate
28 g of divinylbenzene
1.4 g azobisisobutyronitrile
2 g of dimethyl 2,2-azobisisobutyrate.

The solids content of the dispersion obtained was 43.5% by weight, and efflux time from the Ford cup was 106 seconds.

The average particle size of the microcapsules is 5.8 μm with a practical variation in size from 3 to 12 μm.

Example 6

This dispersion was prepared in the manner of Example 1 from the following components:

1464 g of water
50 g of polyvinylpyrrolidone of K 90
10 g of polyacrylic acid of K 50
645 g of diisopropylnaphthalene
285 g of a high-boiling aliphatic hydrocarbon mixture (boiling range 230°-265° C.)
50 g of a mixture of 35.5 g of 3,3-bis(p-dimethylaminophenyl)-6-dimethylaminophthalide and 12.5 g of N-benzoylleuco methylene blue
120 g of methyl methacrylate
2 g of azobisisobutyronitrile p1 30 g of a 20% strength nonaqueous dispersion of a methacrylate copolymer in cyclohexane (methacrylic acid content 4.8%).

However, after heating at 65° C. the polymerization was initially carried out at that temperature for 2¼ hours and then at 70° C. for 2¼ hours.

The solids content of the dispersion obtained was 41.6% by weight, and efflux time from the Ford cup was 50 seconds.

The average particle size of the microcapsules is 5.2 μm with a practical variation in size from 2 to 6 μm.

Example 7

This dispersion was prepared in the manner of Example 6 from the following components:
1334 g of water
45 g of polyvinylpyrrolidone of K 90
11 g of polyacrylic acid of K 50
732 g of diisopropylnaphthalene
313 g of a high-boiling aliphatic hydrocarbon mixture (boiling range 230°-265° C.)
55 g of a mixture of 41 g of 3,,3-bis(p-dimethylaminophenyl)-6-dimethylaminophthalide and 14 g of N-benzoylleuco methylene blue
187 g of methyl methacrylate
3.1g of azobisisobutyronitrile
45 g of a 20% strength nonaqueous dispersion of a methacrylate copolymer in cyclohexane (methacrylic acid content 4.8%).

The solids content of the dispersion obtained was 47% by weight, and efflux time from the Ford cup was 106 seconds.

The average particle size of the microcapsules is 5.4 μm with a practical variation in size from 3 to 6 μm.

Application properties

The microcapsules of the present invention were examined in respect of permeability, color intensity and rub sensitivity.

To this end, the microcapsule dispersions were diluted to a solids content of 16.5% by weight and then applied at a rate of 5 g of microcapsules per M² to
α) standard typewriting paper and
β) typewriting paper which had been pretreated with attapulgite as color developer,
after which these papers were dried.

A) Determination of the permeability

The permeability is a measure of the amount of nonencapsulated color former.

To determine the permeability, paper β) was slightly moistened with dodecylbenzene, causing the nonencapsulated color former to become detached to form a dye with the developer. The degree of coloring of the papers thus treated was measured as the difference in reflectance between an unsprayed sheet of paper β) and a sprayed sheet in a reflectance photometer and expressed in relative % units, with the reflectance of the unsprayed sheet of paper p) being set equal to 100.

B) Determination of the color intensity

The color intensity in question here is the intensity of a certain copy.

To determine the color intensity, a sheet of paper a) was placed with the coated face on a sheet of paper which had been coated with a color developer and a further 3 layers of paper of 38 g/m² were placed on top. This pile was then clamped into an electric typewriter and imprinted with a letter over an area of 4.2×3.4 cm with maximum impression. The intensity of the fourth copy was measured in a reflectance photometer as the difference in the reflectances of the typed and untyped paper and reported in relative % units with the reflectance of the untyped sheet being set equal to 100.

C) Determination of the rub sensitivity

The rub value is a measure of the coloring produced by rubbing only.

To determine the rub value, a sheet of paper a) was placed on top of a sheet of paper coated with a color developer and the sheet of paper a) was pulled slowly and uniformly over the developer-coated paper underneath with a circular, flat weight of 2.1 N /cm² placed on top.

Then the developer-coated paper was stored in the dark for 1 hour, and afterwards its degree of coloring was measured in a reflectance photometer as the difference in the reflectances of the rubbed and unrubbed sheets and reported in relative % units with a reflectance of the unrubbed sheet being set equal to 100.

The table shows the results of test A, B and C.

TABLE

| | Application properties of microcapsules of Examples 1 to 5 | | |
|---|---|---|---|
| Example | Permeability (%) | Color intensity (%) | Rub value (%) |
| 1 | 43 | 29.8 | 23.7 |
| 2 | 7 | 38.8 | 15.5 |
| 3 | 10 | 42.0 | 19.8 |
| 4 | 43 | 23.3 | 15.3 |
| 5 | 27 | 28.5 | 38.5 |

EXAMPLE 8

A mixture of:
1287 g of water
20 g of polyvinylpyrrolidone of K 90
18 g of a phenolsulfonic acid-formaldehyde condensate
770 g of diisopropylnaphthalene
330 g of a high-boiling aliphatic hydrocarbon mixture (boiling range 230°–265° C.)
48 g of a mixture of 36 g of 3,3-bis(p-dimethylaminophenyl)-6-dimethylaminophthalide and 12 g of N-benzoylleuco methylene blue
131 g of methyl methacrylate
56 g of butanediol diacrylate
3.4 g of t-butyl perpivalate
was treated as described in Example 1. It was polymerized at 51° C. for 2 hours and then at increasing temperature up to 72° C. for 4 hours.

EXAMPLE 9

A mixture of:
1293 g of water
20 g of polyvinylpyrrolidone of K 90
27 g of a phenolsulfonic acid-formaldehyde condensate
770 g of diisopropylnaphthalene
330 g of a high-boiling aliphatic hydrocarbon mixture (boiling range 230°–265° C.)
48 g of a mixture of 36 g of 3,3-bis(p-dimethylaminophenyl)-6-dimethylaminophthalide and 12 g of N-benzoylleuco methylene blue
131 g of methyl methacrylate
56 g of butanediol diacrylate
1.4 g of azobisisobutyronitrile
1 g of dimethyl 2,2-azobisisobutyrate
was treated as described in Example 1. It was polymerized at 65° C. for 2 hours and then at increasing temperature up to 71° C. for 4 hours.

EXAMPLE 10

A mixture of:
1287 g of water
20 g of polyvinylpyrrolidone of K 90
18 g of a phenolsulfonic acid-formaldehyde condensate
770 g of diisopropylnaphthalene
330 g of a high-boiling aliphatic hydrocarbon mixture (boiling range 230°–265° C.)
48 g of a mixture of 36 g of 3,3-bis(p-dimethylaminophenyl)-6-dimethylaminophthalide and 12 g of N-benzoylleuco methylene blue
131 g of methyl methacrylate
56 g of butanediol diacrylate
1.4 g of azobisisobutyronitrile
2 g of dimethyl 2,2-azobisisobutyrate
was treated as described in Example 1. It was polymerized at 60° C. for 2 hours and then at increasing temperature up to 75° C. for 4 hours.

Example 11

A mixture of:
1287 g of water
20 g of polyvinylpyrrolidone of K 90
18 g of a phenolsulfonic acid-formaldehyde condensate
1 g of carboxymethylcellulose
770 g of diisopropylnaphthalene
330 g of a high-boiling aliphatic hydrocarbon mixture (boiling range 230°–265° C.)
48 g of a mixture of 36 g of 3,3-bis(p-dimethylaminophenyl)-6-dimethylaminophthalide and 12 g of N-benzoylleuco methylene blue
131 g of methyl methacrylate
56 g of butanediol diacrylate
1.4 g of azobisisobutyronitrile
2 g of dimethyl 2,2-azobisisobutyrate
was treated as described in Example 1.

EXAMPLE 12

A mixture of:
1287 g of water
20 g of polyvinylpyrrolidone of K 90
18 g of a phenolsulfonic acid-formaldehyde condensate
1.3 g of polyacrylic acid
770 g of diisopropylnaphthalene
330 g of a high-boiling aliphatic hydrocarbon mixture (boiling range 230°–265° C.)
48 g of a mixture of 36 g of 3,3-bis(p-dimethylaminophenyl)-6-dimethylaminophthalide and 12 g of N-benzoylleuco methylene blue
131 g of methyl methacrylate
56 g of butanediol diacrylate
1.4 g of azobisisobutyronitrile 2 g of dimethyl 2,2-azobisisobutyrate
was treated as described in Example 1. It was polymerized at 60° C. for 2 hours and then at 65° C. for 4 hours.

Example 13

A mixture of:
1287 g of water
20 g of polyvinylpyrrolidone of K 90
18 g of a phenolsulfonic acid-formaldehyde condensate
770 g of diisopropylnaphthalene
330 g of a high-boiling aliphatic hydrocarbon mixture (boiling range 230°-265° C.)
48 g of a mixture of 36 g of 3,3-bis(p-dimethylaminophenyl)-6-dimethylaminophthalide and 12 g of N-benzoylleuco methylene blue
131 g of methyl methacrylate
56 g of 1,3-propanediol diacrylate
1.4 g of azobisisobutyronitrile
2 g of dimethyl 2,2-azobisisobutyrate
was treated as described in Example 1. It was polymerized at 60° C. for 2 hours and then at 65° C. for 4 hours.

Example 14

A mixture of:
1287 g of water
20 g of polyvinylpyrrolidone of K 90
18 g of a phenolsulfonic acid-formaldehyde condensate
770 g of diisopropylnaphthalene
330 g of a high-boiling aliphatic hydrocarbon mixture (boiling range 230°-265° C.)
48 g of a mixture of 36 g of 3,3-bis(p-dimethylaminophenyl)-6-dimethylaminophthalide and 12 g of N-benzoylleuco methylene blue
131 g of methyl methacrylate
56 g of hexanediol diacrylate
1.4 g of azobisisobutyronitrile
2 g of dimethyl 2,2-azobisisobutyrate
was treated as described in Example 1. It was polymerized at 60° C. for 2 hours and then at 65° C. for 4 hours.

Example 15

A mixture of:
1287 g of water
20 of polyvinylpyrrolidone of K 90
18 g of a phenolsulfonic acid-formaldehyde condensate
770 g of diisopropylnaphthalene
330 g of a high-boiling aliphatic hydrocarbon mixture (boiling range 230°-265° C.)
48 g of a mixture of 36 g of 3,3-bis(p-dimethylaminophenyl)-6-dimethylaminophthalide and 12 g of N-benzoylleuco methylene blue
131 g of methyl methacrylate
56 g of butanediol diacrylate
5.4 g of bis(3,5,5-trimethylhexanoyl) peroxide
was treated as described in Example 1. It was polymerized at 52° C. for 2 hours and then at 59° C. for 4 hours.

Example 16

A mixture of:
1287 g of water
20 g of polyvinylpyrrolidone of K 90
18 g of a phenolsulfonic acid-formaldehyde condensate
1 g of carboxymethylcellulose
770 g of diisopropylnaphthalene
330 g of a high-boiling aliphatic hydrocarbon mixture (boiling range 230°-265° C.)
48 g of a mixture of 36 g of 3,3-bis(p-dimethylaminophenyl)-6-dimethylaminophthalide and 12 g of N-benzoylleuco methylene blue
131 g of methyl methacrylate
56 g of butanediol diacrylate
1.4 g of azobisisobutyronitrile
2 g of dimethyl 2,2-azobisisobutyrate
All ingredients except the monomers and the initiators were dispersed at room temperature for 5 minutes. The remaining substances were then added and dispersing was continued for a further 15 minutes. The mixture was polymerized at 60° C. for 2 hours and then at 65° C. for 4 hours.

Example 17

A mixture of:
128 g of water
2 g of polyvinylpyrrolidone of K 90
1.8 g of a phenolsulfonic acid-formaldehyde condensate
13.1 g of methyl methacrylate
5.6 g of butanediol diacrylate
88 g of di(2-ethylhexyl) phthalate
22 g of a scent
0.14 g of azobisisobutyronitrile
0.2 g of dimethyl 2,2-azobisisobutyrate
All the ingredients were dispersed at room temperature for 3 minutes. The mixture was polymerized at 60° C. for 2 hours and then at 65° C. for 4 hours. The scent-containing microcapsules have a diameter within the range from 2 to 5 μm.

Example 18

A mixture of:
128 g of water
2 g of polyvinylpyrrolidone of K 90
1.8 g of a phenolsulfonic acid-formaldehyde condensate
13.1 g of methyl methacrylate
5.6 g of butanediol diacrylate
110 g of metolachlor
0.14 g of azobisisobutyronitrile
0.2 g of dimethyl 2,2-azobisisobutyrate
All the ingredients were dispersed at room temperature for 3 minutes. The mixture was polymerized at 60° C. for 2 hours and then at 65° C. for 4 hours. The microcapsules containing the crop protection agent have a diameter within the range from 3 to 8 μm.

Example 19

A mixture of:
128 g of water
2 g of polyvinylpyrrolidone of K 90
1.8 g of a phenolsulfonic acid-formaldehyde condensate
18.6 g of methyl methacrylate
88 g of lead(II) 2-ethylhexanoate
22 g of white oil
0.1 g of azobisisobutyronitrile
0.2 g of dimethyl 2,2-azobisisobutyrate
All the ingredients were dispersed at room temperature for 5 minutes. The mixture was polymerized at 60° C. for 2 hours and then at 65° C. for 4 hours. The microcapsules containing the lead salt have a diameter within the range from 2 to 6 μm.

Examples 8 to 19 likewise produce microcapsules having properties similar to those of Examples 1 to 7.

We claim:

1. Microcapsules which are obtained by polymerizing
   A) 30–100% by weight of one or more $C_1$–$C_{24}$-alkyl esters of acrylic or methacrylic acid (monomers I),
   B) 0–70% by weight of a bi- or polyfunctional monomer (monomer II) which is soluble in a solvent, which solvent is insoluble or only sparingly soluble in water, the solvent being present together with the monomers and a free radical initiator as the disperse phase of a stable oil-in-water emulsion, the polymerization being initiated and controlled by decomposing the free radical initiator at at least two temperatures, the first and lower temperature being from 51° to 65° C., and the subsequent and higher temperature being from 59° to 72° C.

2. The microcapsules of claim 1, wherein the first and lower decomposition temperature is about 600° C. and the subsequent and higher decomposition temperature is about 65° C.

3. Microcapsules as claimed in claim 1, obtained by polymerizing
   A) 30–95% by weight of monomers I,
   B) 5–40 % by weight of monomer II.

4. Microcapsules as claimed in claim 1, in which the water-insoluble or only sparingly water-soluble solvent has a boiling point within the range from 150° to 3500° C.

5. Microcapsules as claimed in claim 1, in which the water-insoluble or only sparingly water-soluble solvent is diisopropylnaphthalene or dodecylbenzene.

6. Microcapsules as claimed in claim 1, containing a color former.

7. Microcapsules which are obtained by polymerizing
   A) 30–100% by weight of one or more $C_1$–$C_{24}$-alkyl esters of acrylic or methacrylic acid (monomers I),
   B) 0–70% by weight of a bi- or polyfunctional monomer (monomer II) which is soluble in a solvent which is insoluble or only sparingly soluble in water, and
   C) 0–40% by weight of other monomers (monomers III), said monomers being dissolved in a solvent which is insoluble or only sparingly soluble in water, the solvent being present together with the monomers and a free radical initiator as the disperse phase of a stable oil-in-water emulsion and the polymerization being initiated and controlled by decomposing the free radical initiator in such a way that at the beginning the half-life of the initiator is set at times between about 3 and 30 hours by polymerizing at the corresponding temperature and in the second and possibly further polymerization periods the decomposition of the initiator is increased by raising the polymerization temperature and thereby decreasing the half-life of the initiator by at least a factor of two in one step or continuously.

8. Microcapsules which are obtained by polymerizing
   A) 30–100% by weight of one or more $C_1$–$C_{24}$-alkyl esters of acrylic or methacrylic acid (monomers I),
   B) 0–70% by weight of a bi- or polyfunctional monomer (monomer II) which is soluble in a solvent which is insoluble or only sparingly soluble in water, and
   C) 0–40% by weight of other monomers (monomers III), said monomers being dissolved in a solvent which is insoluble or only sparingly soluble in water, the solvent being present together with the monomers and a free radical initiator as the disperse phase of a stable oil-in-water emulsion and the polymerization being initiated and controlled by the thermal decomposition of the free radical initiator in such a way that the temperature is increased in one or more steps or continuously, and linearly or nonlinearly so that the first polymerization period is characterized by a decomposition rate of the free radical initiators which is slower than the second and possibly further polymerization periods.

* * * * *

UNITED STATES PATENT AND TRADEMARK OFFICE
CERTIFICATE OF CORRECTION

PATENT NO. : 5,292,835
DATED      : March 8, 1994
INVENTOR(S) : JAHNS et al.

It is certified that error appears in the above-indentified patent and that said Letters Patent is hereby corrected as shown below:

Claim 4, column 13, line 30, "3500" should be --350--.

Claim 2, column 13, line 20, "600°C" should be --60°C--.

Signed and Sealed this

Thirtieth Day of August, 1994

BRUCE LEHMAN

*Attest:*

*Attesting Officer*   *Commissioner of Patents and Trademarks*